United States Patent [19]

Boultinghouse

[11] Patent Number: 4,794,026
[45] Date of Patent: Dec. 27, 1988

[54] REFLECTOR CONSTRUCTION
[75] Inventor: Harold D. Boultinghouse, Bartlesville, Okla.
[73] Assignee: Phillips Petroleum Company, Bartlesville, Okla.
[21] Appl. No.: 737,846
[22] Filed: May 24, 1985
[51] Int. Cl.$^4$ .............................................. B27N 5/02
[52] U.S. Cl. .................................. 428/35.9; 428/419; 428/447; 428/450; 428/457
[58] Field of Search ................. 428/419, 447, 35, 450, 428/457

[56] References Cited

U.S. PATENT DOCUMENTS

| | | | |
|---|---|---|---|
| 3,410,636 | 11/1968 | Herrick | 350/288 |
| 3,476,826 | 11/1969 | Millen | 260/824 |
| 3,979,543 | 9/1976 | Higbee | 428/331 |
| 4,138,526 | 2/1979 | Borresen | 428/327 |
| 4,348,463 | 9/1982 | Ohno et al. | 428/447 |
| 4,507,712 | 5/1985 | Dolan et al. | 362/61 |
| 4,528,619 | 7/1985 | Dolan et al. | 362/61 |

Primary Examiner—George F. Lesmes
Assistant Examiner—P. R. Schwartz
Attorney, Agent, or Firm—A. W. Umphlett

[57] ABSTRACT

An article of manufacture exhibiting enhanced reflective properties with increased temperature comprising a thermoplastic, such as poly(phenylene sulfide), coated reflector manufactured by the process comprising coating a low viscosity silicone resin on to a heat resistant thermoplastic substrate, curing said coating and depositing a metallic coating such as by vacuum metallization. Optionally an exterior clear coating can be applied. Upon cooling the reflective surface returns to its normal reflective state.

7 Claims, No Drawings

REFLECTOR CONSTRUCTION

BACKGROUND OF THE INVENTION

This invention relates to reflective surfaces. In another aspect this invention relates to molded articles of manufacture having reflective surfaces. A further aspect of this invention relates to molded articles formed from poly(arylene sulfide) resins having reflective surfaces exhibiting enhanced reflective properties with increased temperature.

This invention relates to the preparation of a high quality specular surface, and, more particularly, to means and process for conditioning a substrate surface and subsequent addition of a reflective layer to provide articles of manufacture exhibiting enhanced reflective properties with increased temperature. Various methods and materials of construction are known for the production of articles having reflective surfaces. There is a continuing effort to produce articles suitable for a variety of applications. For example, it is highly desirable to fabricate headlamps of plastic rather than traditional glass to reduce weight for fuel economy in automobiles. Resins produced from poly(arylene sulfide), for example, polyphenylene sulfide, have proven to be suitable materials for the fabrication of molded articles subject to high temperatures such as headlamp reflectors. The present invention is directed to plastic articles of manufacture which can be fabricated into automobile headlamps and other articles from poly(arylene sulfide) resins having reflective surfaces of desirable properties.

OBJECTS

Accordingly, an object of the invention is to provide a reflector construction.

Another object of this invention is to provide molded articles from thermoplastic materials which have reflective surfaces.

A further object of this invention is to provide a reflector construction exhibiting varying brightness upon application of heat to reflector surface.

Still another object of this invention is to provide reflector structures exhibiting improved reflection properties of the surface.

A further object of the invention is to provide metallized plastic substrates exhibiting increased brightness with increased temperature.

Other objects, aspects, as well as the several advantages of the invention will be apparent to those skilled in the art upon reading the specification and appended claims.

SUMMARY OF THE INVENTION

According to the invention, an article of manufacture exhibiting enhanced reflective properties with increased temperature comprises:

(1) a thermoplastic substrate, such as a poly(arylene sulfide) resin, specifically poly(phenylene sulfide), (2) a cured coating of a low viscosity silicone resin on at least one surface of the substrate, and (3) a metallic coating on the silicone resin cured coating or layer.

The metallic coating becomes very shiny and bright at elevated temperatures but returns to normal look upon cooling.

In an optional embodiment of the invention an exterior clear coating can be applied to the reflective metallic coating.

In accordance with a specific process embodiment of the invention the process comprises the steps of:

(1) optionally precleaning or otherwise pretreating surfaces of thermoplastic substrates, such as poly(arylene sulfide) resin, (2) depositing a coating of a low viscosity silicone resin onto at least one surface of the substrate, (3) curing the silicone resin coating by heating to a temperature in the range of about 400°–500° F., (4) depositing a metallic coating to the cured silicone coating, such as by vacuum metallization, and (5) optionally applying an exterior clear covering to the reflective metallic surface.

The resulting molded reflective articles of the invention can be subjected to temperatures of up to about 500° F. and higher with no detrimental effects to the structure. Many commercial reflectors are operated at temperatures ranging from about 70° F. to about 500° F.

DETAILED DESCRIPTION OF THE INVENTION

The reflector construction of the invention includes a substrate made at least in part of a poly(arylene sulfide) resin, such as poly(phenylene sulfide), and a reflective layer adhering to the substrate, preferably through an appropriate intermediate material comprising a cured coating of a low viscosity silicone resin.

The poly(arylene sulfide) can be any polymeric material formed predominately of one or more aryl moieties having sulfide linkages. Without being limited thereto, uncured or partially cured poly(arylene sulfide) whether homopolymer, copolymer, terpolymer, and the like, or a blend of such polymers, can be used in the practice of the invention. The uncured or partially cured polymer is a polymer the molecular weight of which can be increased by either lengthining of a molecular chain or by crosslinking or by combination of both by supplying thereto sufficient energy, such as heat. Suitable starting poly(arylene sulfide) polymers include, but are not limited to those described in U.S. Pat. No. 3,354,129 incorporated by reference herein. Such polymers include those represented by the formula $+R-S+_n$ wherein R is a substituted or unsubstituted benzene ring and n is at least 1000.

The manufacture of poly(arylene sulfide)s is known in the art. A polyhalosubstituted aromatic compound is reacted with a sulfur source in a polar organic solvent. In a commercial form of this process, para-dichlorobenzene is reacted with sodium sulfide in N-methylpyrrolidone solvent. Examples of these poly(arylene sulfide) polymers suitable for purposes of the invention include poly(2,4-tolylene sulfide, poly(4,4'-biphenylene sulfide) and poly(phenylene sulfide). Because of its availability and desirable properties (such as high chemical resistance, nonflammability, and high strength and hardness) poly(phenylene sulfide) is the presently preferred poly(arylene sulfide).

A process for producing high molecular weight, film-grade poly(phenylene sulfide) is described in U.S. Pat. No. 3,919,177. According to the process described therein, p-dichlorobenzene is reacted with sodium sulfide in N-methylpyrrolidone solvent in the presence of an alkali metal carboxylate. The resulting polymer resin has a melt viscosity of 100 to 600,000 poise, preferably 300 to 100,000 poise at 300° C. and a shear rate of 200 sec$^{-1}$. Various poly(arylene sulfides) are commercially available under the trademark Ryton ® from Phillips Petroleum Company, Bartlesville, Okla.

Although our invention is not limited thereto, the resin compositions can also contain other ingredients such as reinforcing agents and fillers.

The reinforcing agent can be, for example, glass. Fiber glass is preferred because in this form (i.e. high ratio of length to diameter) the reinforcement utility of the glass is optimized. Other forms of glass such as, for example, power, grain and beads are, nonetheless, within the scope of our invention. Examples of other suitable reinforcing agents include, by way of nonlimiting example, asbestos fibers and ceramic fibers.

Fillers can be used to improve the dimensional stability, thermal conductivity and mechanical strength of the composition. Suitable fillers include, for example, talc, silica, clay, alumina, calcium sulfate, calcium carbonate, mica and so on. The fillers can be in the form of, for example, powder, grain or fiber.

Besides reinforcing agents and fillers the compositions of our invention can optionally contain relatively small amounts of other ingredients such as, for example, pigments and processing aids. In a preferred embodiment the polymer is poly(phenylene sulfide), which contains mineral filler and glass fiber reinforcement which makes this material suitable for injection molding.

Preferably, the surface of a poly(arylene sulfide) substrate is cleaned prior to deposition of the silicone resin to obtain good adhesion between the resin and substrate. Cleaning can be carried out by any suitable technique, such as treatment with a degreasing agent, ultrasonics, etching or electropolishing.

Before application of the silicone resin base coat to the substrate it is preferred that the surface of the substrate be further treated to polarize the surface to be coated through oxidation to promote better adhesion. One method of accomplishing this is by flame treatment. One suitable flame treatment method comprises passing a 10% excess of air-to-methane oxidizing flame over the surface for a time sufficient to alter the surface characteristics as confirmed by reduction or elimination of beading by a water drop on the surface. Another method of polarizing the substrate surface is to subject the surface to corona discharge treatment.

The base coat of silicone resin can be applied to the polymeric substrate by any suitable method as brushing, dipping or spraying. In addition, the silicone resin coat can be thinned with an appropriate diluent, preferably an aromatic hydrocarbon for ease of application.

The base coat resin is a single component low viscosity silicone resin having a viscosity in the range of 100-200 centipoise. Any silicone resin coating can be used that exhibits a low viscosity and is useable at temperatures in the range of about 400°-500° F.

The silicone resin of the invention is commercially available under the name Humiseal IC45 from Columbia Chase Corp., Woodside, N.Y. Typical properties of Humiseal TypeIC45 are as follows:

| | |
|---|---|
| Specific Weight, lbs. per gal, Fed-Std-141, Meth. 4184 | 8.0 to 8.8 |
| Solids Content % by weight, per Fed-Std-141, Meth. 4044 | 49 to 51 |
| Viscosity, centipoises, per Fed-Std-141, Meth. 4287 | 100-200 |
| Flash Point, °F., per Fed-Std-141, Meth. 4291 | 80 |
| Drying Time to Handle, per Fed-Std-141, Meth. 4061 | Requires oven cure |
| Recommended Curing Conditions | 2 hrs. at 480° F. |
| Time required to reach optimum properties | Upon curing |
| Thinner, if needed (dipping & brushing) | Thinner #521 |
| (spraying) | Thinner SP420 |
| Pot Life at Room Temperature | 1 Year |
| Shelf Life at Room Temperature | 1 Year |

In one specific operation of the invention, silicone resin coated substrate is subjected to curing by heating to an elevated temperature in the range of about 400°-500° F. The curing can be carried out in an inert atmosphere or an oxidizing atmosphere. The length of time of heating will be sufficient to effect curing of the silicone resin and form a firm bond between silicone resin and substrate, but ordinarily will be about 2 hours.

The silicone resin coated substrate is then subjected to conditions to deposit a reflective layer, e.g., aluminum, preferably by evaporation in a manner well known in the art. A vacuum metallized coating can be deposited on the substrate surface. The aluminum is supplied in the form of wire or beads, depending on the equipment and the surface area to be covered.

Although the process is described with use of aluminum as the reflective coating, other reflective metals, such as tin can be employed.

The articles prepared as described above can be covered with a clear top covering for protection and to prevent oxidation of the metal coating. Suitable materials include glass. Preferably this should be spaced away from the surface and source of surface heat due to deleterious effects of the heat on the covering material.

The use of a poly(arylene sulfide), such as poly(phenylene sulfide), as the substrate material for reflective articles offers the advantages of being light weight, resistant to chemicals and adverse environmental conditions, relatively stable to high temperatures and flexible.

The thickness of the poly(arylene sulfide) substrate is not critical and will be determined by economic considerations and conditions under which it will be used. If flexibility is desired in the substrate, a thinner substrate can be chosen. If strength is important, a thicker substrate can be used. The temperature of curing and metal deposition will be a factor of choice of the particular poly(arylene sulfide) material chosen.

EXAMPLE

An automotive headlamp was fabricated using the invention as follows. A headlamp having a generally rectangular shape and a generally concaved interior surface was molded from a poly(phenylene sulfide) resin composition available from Phillips Petroleum Company, Bartlesville, Okla., under the tradename Ryton comprising the following ingredients using conventional molding thechniques.

| Composition | Wt. % |
|---|---|
| Poly(phenylene sulfide) | 38% |
| Fiberglass | 35% |
| Calcium Sulfate | 25.25% |
| Silane | 0.5% |
| Polyethylene | 0.25% |
| Lithium Carbonate | 1% |

The Ryton headlamp's interior concave surface was then flame treated to render the surface water wettable by passing a 10% excess air to methane oxidizing flame several times across the surface. The temperature of the flame is considered to be between 500°-800° F.

After flame treating, a silicone resin (Humiseal IC45) dissolved in xylene liquid was sprayed on the flame treated surface using an ordinary spray gun. The xylene is used to dilute the silicone to a viscosity for spraying. The spray coating was followed by baking of the headlamp with the silicone coating in an oven at 480° F. for two hours to dry the coating. The headlamps were removed from the oven and allowed to cool to room temperature.

The headlamps were then placed in a Varian Model 3120 Coating system from Variam of Palo Alto, Calif., and aluminum coated using a short length of aluminum wire as a source.

The finished reflectors had a semi-bright finish which upon heating above about 350° F. became increasingly bright. The article was heated using the flame described above. Removal of the heat and subsequent cooling of the article below 350° F. caused the surface to return to its semi-bright state. The heating was repeated numerous times resulting in an increase in reflectance with each heating and return to the semi-bright state with each cooling.

That which is claimed is:

1. An article of manufacture exhibiting increased reflectance upon exposure to increased temperatures comprising:
   (a) a substrate formed from poly(arylene sulfide) resin,
   (b) a thermally cured coating of a relatively low viscosity silicone resin in direct contact with and adherence to at least one surface of said substrate, and
   (c) a reflective layer in direct contact with and adherent to said silicone coating.

2. An article according to claim 1 wherein said substrate is formed from poly(phenylene sulfide).

3. An article according to claim 1 which additionally comprises:
   (d) an exterior clear coating placed over and spaced away from said reflective layer.

4. An article according to claim 1 wherein said reflective layer is a metallic coating.

5. An article according to claim 4 wherein the substrate is poly(phenylene sulfide) and the silicone resin has a viscosity ranging from about 100 to about 200 centipoises.

6. An article according to claim 5 wherein the metallic coating is an aluminum metallic coating.

7. An article according to claim 1 comprising an enclosed molded article containing a filament which will provide the heat necessary to enhance the reflective properties of the reflective layer on said surface.

* * * * *